(12) United States Patent
Baird, III et al.

(10) Patent No.: US 6,732,278 B2
(45) Date of Patent: May 4, 2004

(54) APPARATUS AND METHOD FOR AUTHENTICATING ACCESS TO A NETWORK RESOURCE

(76) Inventors: Leemon C. Baird, III, 827 W. Avenue L, Apt. 41, Lancaster, CA (US) 93534; Mance E. Harmon, 3580 Cowhand Dr., Colorado Springs, CO (US) 80922; R. Reed Young, 6950 Waterwood Ct., Colorado Springs, CO (US) 80918; James E. Armstrong, Jr., 5524 Vantage Vista Dr., Colorado Springs, CO (US) 80919

( * ) Notice: Subject to any disclaimer, the term of this patent is extended or adjusted under 35 U.S.C. 154(b) by 417 days.

(21) Appl. No.: 09/782,342

(22) Filed: Feb. 12, 2001

(65) Prior Publication Data

US 2002/0112183 A1 Aug. 15, 2002

(51) Int. Cl.[7] .......................... H04L 9/32; H04L 29/06; H04L 9/10
(52) U.S. Cl. ................... 713/201; 713/202; 713/200; 713/182
(58) Field of Search ................ 713/200, 201, 713/202, 183, 184, 185, 186, 182

(56) References Cited

U.S. PATENT DOCUMENTS

| | | | |
|---|---|---|---|
| 5,280,527 A | | 1/1994 | Gullman et al. |
| 5,524,072 A | * | 6/1996 | Labaton et al. ............... 705/72 |
| 5,719,560 A | * | 2/1998 | Watkins ...................... 340/5.5 |
| 5,764,789 A | | 6/1998 | Pare, Jr. et al. |
| 6,035,406 A | * | 3/2000 | Moussa et al. ............. 713/202 |
| 6,038,666 A | * | 3/2000 | Hsu et al. .................... 713/186 |
| 6,189,103 B1 | * | 2/2001 | Nevarez et al. ............. 713/201 |

FOREIGN PATENT DOCUMENTS

| | | |
|---|---|---|
| EP | 0924657 | 6/1999 |
| EP | 0986209 | 3/2000 |
| WO | 0065770 | 11/2000 |

OTHER PUBLICATIONS

Article—*Biometrics, Is it a Viable Proposition for Identity Authentication and Access Control?* Computers & Security, 14 (1995) 205–214.

* cited by examiner

*Primary Examiner*—Ly V. Hua
(74) *Attorney, Agent, or Firm*—Law Office of Dale B. Halling

(57) ABSTRACT

A device for providing access to a remote site is disclosed. Access to the device is gained through an authentication process during which a user password and biometrics are provided to the device. The device also includes a security feature such that only authorized users of the specific device can gain access to it. Once authenticated, the device authorizes access to a remote site (e.g., a web site or a server on a local area network). The communications from the device to the remote site is encrypted and further the hand-held device uses a computer generated password to gain access to the site. In this way, user generated passwords, which are typically simple and infrequently changed, are avoided in favor of a more complex and frequently changed computer generated passwords for site access.

49 Claims, 8 Drawing Sheets

APPARATUS AND METHOD FOR AUTHENTICATING ACCESS TO A NETWORK RESOURCE

FIELD OF THE INVENTION

The present invention relates to an authentication method and apparatus for providing secure access to a network device or online resource for the purpose of communicating with or controlling the device or resource. More particularly the present invention relates to a method and apparatus that allows a user to securely access network devices and online resources, even when communicating through an insecure intermediate device.

BACKGROUND OF THE INVENTION

Most online services and resources (e.g., Internet sites, network servers, appliances accessible through wireless techniques) use some form of user authentication to provide a secure link between the user and the site and to restrict access by unauthorized users. It is known, however, that there are certain limitations and vulnerabilities associated with the each of the security techniques currently in use.

The most common form of authentication is the entry of a user-chosen password when logging onto a computer, accessing resources on a local area network (LAN), communicating with a controlled appliance or connecting to an online service such as a store or bank via the Internet. This process is known to have security vulnerabilities because users choose easily-guessed passwords, reuse them for multiple accounts, change them infrequently, and are easily tricked into divulging them when prompted. The passwords are visible to others looking over the user's shoulders, and to a password-collecting virus residing on the user's personal computer (PC). Further, the operator of the online site has access to all the users' passwords, and if in fact the same password is employed by the user at multiple sites, which is generally the case, the site operator can access other sites, spoofing the user.

Another common form of authentication is a card with a magnetic stripe, protected by a 4-digit personal identification number (PIN), as commonly used in automatic teller machines (ATM). This security has been defeated by locating a phony ATM in a public place. The unknowing user enters the card and PIN number into an apparently legitimate automatic teller machine, but while dispensing money or appearing to perform the requested instruction, in fact the ATM reads enough information from the card to duplicate it and also captures the PIN associated with the card.

The smart card or smart ring is another authentication device that is gaining popularity. In one computer-based application, while accessing a stock trading service through a Web browser, for example, the user inserts the smart card into a reader mounted on the PC. When the user makes a trade, the smart card communicates with the service to authorize the trade. Unfortunately, this process is no more secure than the PC alone. If the PC is infected with a virus, the virus can change the user's keyboard commands before sending them to the stock trading service, and change the service's replies before displaying them on the screen. In this way, the smart card authorizes the transactions that the virus chooses, rather than the transactions that the user has initiated and secured with the smart card.

A more sophisticated smart card includes a small screen that displays a different pseudorandom number at a given frequency, once every minute, for instance. The user reads the number from the smart card and types it into the device to which access is desired. The number serves as a password, albeit one that is changed frequently, to the device. The password is based on the current date and time, and the device and the smart card are date/time synchronized. Further, both employ the same complex algorithm to calculate the pseudorandom number from the current date and time. The device therefore permits access if the correct number was entered. Other devices and smart cards require biometric matches to gain access, such as by way of a fingerprint or iris reader. If there is not a biometric match, the user cannot gain access to the device or service. However, even when a biometrics or pseudorandom number match is secured, the PC itself can present an insecure environment if an unknown virus resides on the PC. As discussed above with respect to the smart card, the virus can unknowingly alter the transaction.

Further, when a user purchases a smart card and an complementary PC, that alone does not allow the user to access existing online services. The software for each online service must be tailored for the specific smart card purchased. The typical smart card does not require a user-provided password, but the card carries on a conversation with an on-line service or resource according to the process embodied in the smart card by it's manufacturer. Thus a typical smart card cannot be used with any on-line resource. Instead, the operator of the on-line resource must incorporate a complementary process to allow users of the card to gain access to the resource. Today, most on-line resources or websites use passwords for access, but are not equipped to interface with smart cards for access control. By contrast, the teachings of the present invention provide additional access security using the existing infrastructure.

There is a need for an apparatus and method that can securely authenticate a user to existing online services, without requiring modifications to the current access process in use by those services, including especially the process for logging on to the site. Further the user should be able to conduct the transaction in a secure environment to ensure that transaction is in fact executed as desired.

SUMMARY OF THE INVENTION

The present invention overcomes the limitations of the prior art by providing an apparatus that allows secure authentication using the existing security infrastructure common on local area networks and the Internet, and using existing portable computing devices. It does this by requiring the user to authenticate to the device using three different types of authentication: what you know (a passphrase or password), what you have (a particular device), and what you are (your biometrics). Once the user has successfully authenticated to the device, the device then authenticates to a site using the site's existing access infrastructure and methodology. However, in accessing the site, the device uses strong (i.e., not easily discovered) passwords for the user, changing them frequently, and not allowing the user to see them or to be tricked into revealing them. This process provides secure site access without requiring changes to the present ubiquitous site log-in processes. But, the security of the current password-based infrastructure is significantly enhanced, because the passwords are strong passwords generated by the apparatus of the present invention (not short words from a dictionary that a user would likely choose), the passwords are different for every account (not reused on multiple accounts as many users do), the passwords are changed frequently by the device (which users rarely do), and the password may not even be known by the user (so the user cannot be tricked into revealing it through a so-called "social engineering" attack).

In one embodiment the device of the present invention is operative in conjunction with a personal computer. The transaction is displayed to the user on the device, it is not displayed on the insecure PC. Further, the device accepts PINs and passwords directly from the user, rather than through the insecure PC.

BRIEF DESCRIPTION OF THE DRAWINGS

The present invention can be more easily understood and the further advantages and uses thereof more readily apparent, when considered in view of the description of the preferred embodiments and the following figures, in which.

DETAILED DESCRIPTION OF THE PREFERRED EMBODIMENTS

Before describing in detail the particular security device constructed according to the teachings of the present invention, it should be observed that the present invention resides primarily in a novel and non-obvious combination of elements and method steps generally related to a secure network access device. Accordingly, the hardware components and method steps described herein have been represented by conventional elements in the figures and the specification, showing only those specific details that are pertinent to the present invention, so as not to obscure the disclosure with structural details that are readily apparent to those skilled in the art having the benefit of the description herein.

Figure 1:
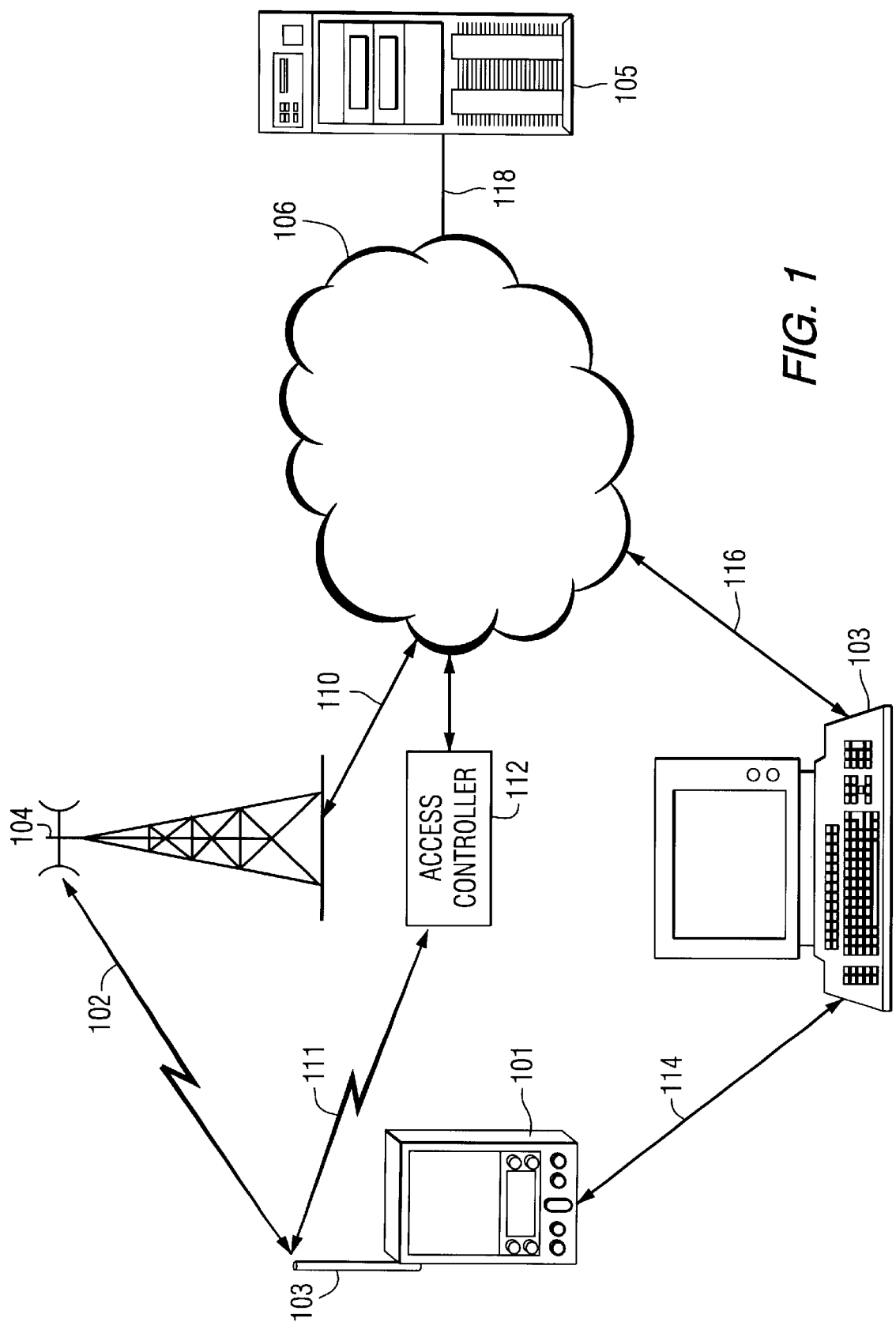
FIG. 1 is a block diagram illustrating the interconnection between the device of the present invention and a remote site.

FIG. 1 is a functional block diagram of the main components of the environment in which the present invention operates. A device 101 (in one embodiment a relatively small handheld device) includes data and executable code processing capabilities for allowing a user to access a site 105. Exemplary devices serving the functions of the device 101 into which the teachings of the present invention can be embodied include: personal digital assistants, handheld or laptop computers, cellular telephones, smart pagers. These devices continue to perform there originally intended functions; the teachings of the present invention are provided as a supplement to provide a level of security not heretofore available with these or other devices. Generally, the teachings of the present invention can be applied to any device that includes processing capability (e.g., microprocessor, microcontroller), an input capability (e.g., keyboard, microphone), and an output capability (e.g., speaker, display screen). In addition to those identified above, present and future devices that have or will have such capabilities include: wristwatches, telephones, microwave ovens, televisions, electronic books, hearing aids, and surgically embedded computers. The device 101 can communicate directly to a site 105 (e.g., an on-line e-commerce site or a server or other network resource (e.g., computer, printer) through one or more of the several different communications paths illustrated in FIG. 1. One such communication path includes a radio frequency wireless link 102 wherein a radio or transceiver (not shown) within the device 101 communicates bi-directionally via an antenna 103 with a radio or transceiver (not shown) at a base station 104. Exemplary embodiments of the communications link 102 include a cellular phone network or a personal communications services (PCS) network. The base station 104 communicates bi-directionally with a network 106 over either a wired or wireless communications path 110. Access to the network 106 by the device 101 can also be established over a communications link 111 to an access controller 112, which is functionally integrated into the network 106. Exemplary embodiments include those implementing the Bluetooth or IEEE 802.11 standards. In one embodiment, the information communicated over the various links illustrated in FIG. 1 is in encrypted form.

The device 101 can also communicate with the network 106 via a computer 103. The link 114 can be implemented by a wired connection, an infrared connection, optical fiber, a radio frequency communication connection (e.g. Bluetooth or IEEE 802.11) or other links known to those skilled in the art. The link 116 can be implemented by communications schemes similar to those implementing the link 110. Depending on the specific embodiment, the network 106 incorporates one or more of the following communications devices and network types: the Internet, local area networks, servers, routers, bridges, firewalls, public or private land-based communications lines, wireless services and infrared services.

Typically, the user of the device 101 desires to access multiple sites, of which the site 105 is an example, via the network 106 and a communications link 118. Each site represented by the site 105 has multiple accounts or users who can access the site, and each employs its own identification and access protocol. Further, each account at each site requires entry of a user password to gain access. Each of the communications links or paths illustrated in FIG. 1 is generally insecure and subject to traffic monitoring and data alteration by a user's opponent or adversary. In an effort to improve the security of the transaction, the device 101 and the site 105 typically encrypt information communicated between them over the network 106 so that adversaries monitoring the network 106 or unknown devices operating on the network cannot detect, decipher or modify the information in transit. Typical encryption protocols include the secure sockets layer (SSL) protocol used by web sites with an https:// address or the secure HTTP (S-HTTP) protocol. The various communications links shown in FIG. 1 can also be encrypted. For instance, the Bluetooth wireless standard referred to above includes an encryption protocol for use on Bluetooth links.

Like the network 106, the computer 103 (typically a personal computer, laptop computer or work station in a home, office or cyber café) is not a trusted device. As discussed above, the computer 103 may include virus infections or other malicious code unknown to the computer user.

The various communications links illustrated in FIG. 1 are intended to provide alternative techniques for accessing the network 106 from the device 101. The types of communications elements incorporated into the device 101 dictate which of the many communications links and techniques are utilized by the device 101. For example, if the device 101 is always used proximate the computer 103, then a simple infrared communications scheme is used to establish the communications link between them. In such an embodiment, the device 101 need not include a transceiver for accessing the base station 104 or the access controller 112. Alternatively, if the device 101 is typically used in a remote or field setting, likely the communications link 102 is the technique of choice and therefore, the device 101 requires the necessary radio frequency receiving and transmitting apparatuses for operating on the communications link 102 and communicating with the base station 104.

Figure 2:
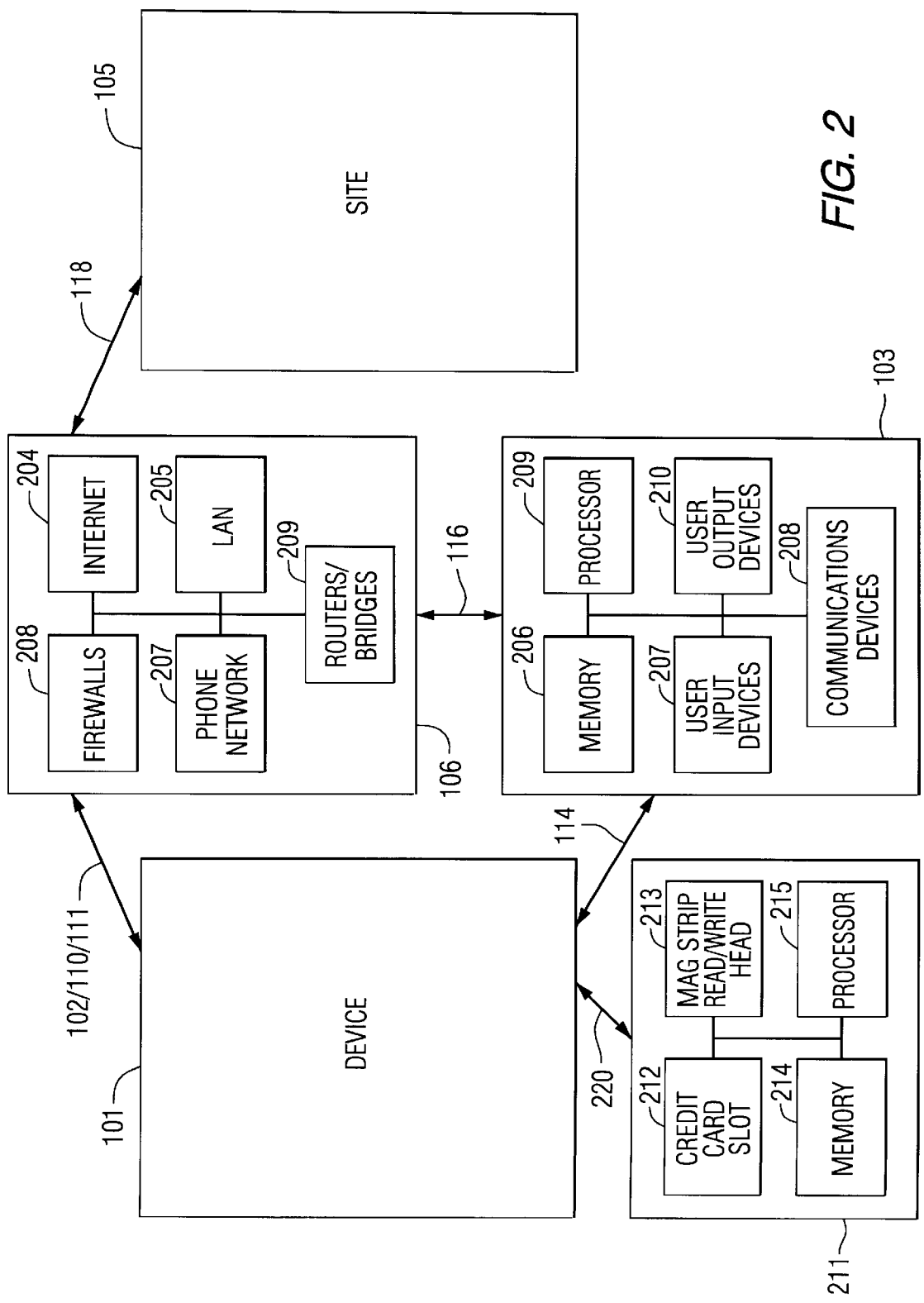
FIG. 2 illustrates further details of certain components illustrated in FIG. 1.

FIG. 2 illustrates additional details for several of the elements shown in FIG. 1. The computer 103 includes a memory 206, user input devices 207, a processor 209 and user output devices 210. These are conventional elements of a computer and are well known to those skilled in the art. The computer 103 also includes one or more communications devices. The specific capabilities of the communications devices are determined by which of the many FIG. 1 communications links are implemented in a specific application of the present invention. These communication devices 208 include: a radio frequency receiver and transmitter (transceiver), optical communication devices and infrared communication devices, each incorporating the necessary protocols, hardware and software elements as determined by the communications scheme employed.

As shown in detail in FIG. 2 and as discussed in conjunction with FIG. 1 above, the network 106 represents the Internet 204, a local area network 205 or a public or private telephone network 207. Certain of these networks include firewalls 208, routers/bridges 209, and any other computer or communication apparatus required for connecting the various networks. The various communications links operative with the network 106 are repeated from FIG. 1 in FIG. 2.

As shown in FIG. 2, the device 101 can further be connected to a credit card writer 211 via a communications link 220. The credit card writer 211 includes a credit card slot 212 for inserting a credit card carrying a magnetic strip. A magnetic read/write head 213 changes or encodes new data on the credit card strip. The credit card writer 211 in one embodiment also includes a memory 214 and a processor 215 for controlling the strip reading and writing processes. The details of the process by which the device 101 creates or modifies a credit card is discussed further herein below.

Figure 3:
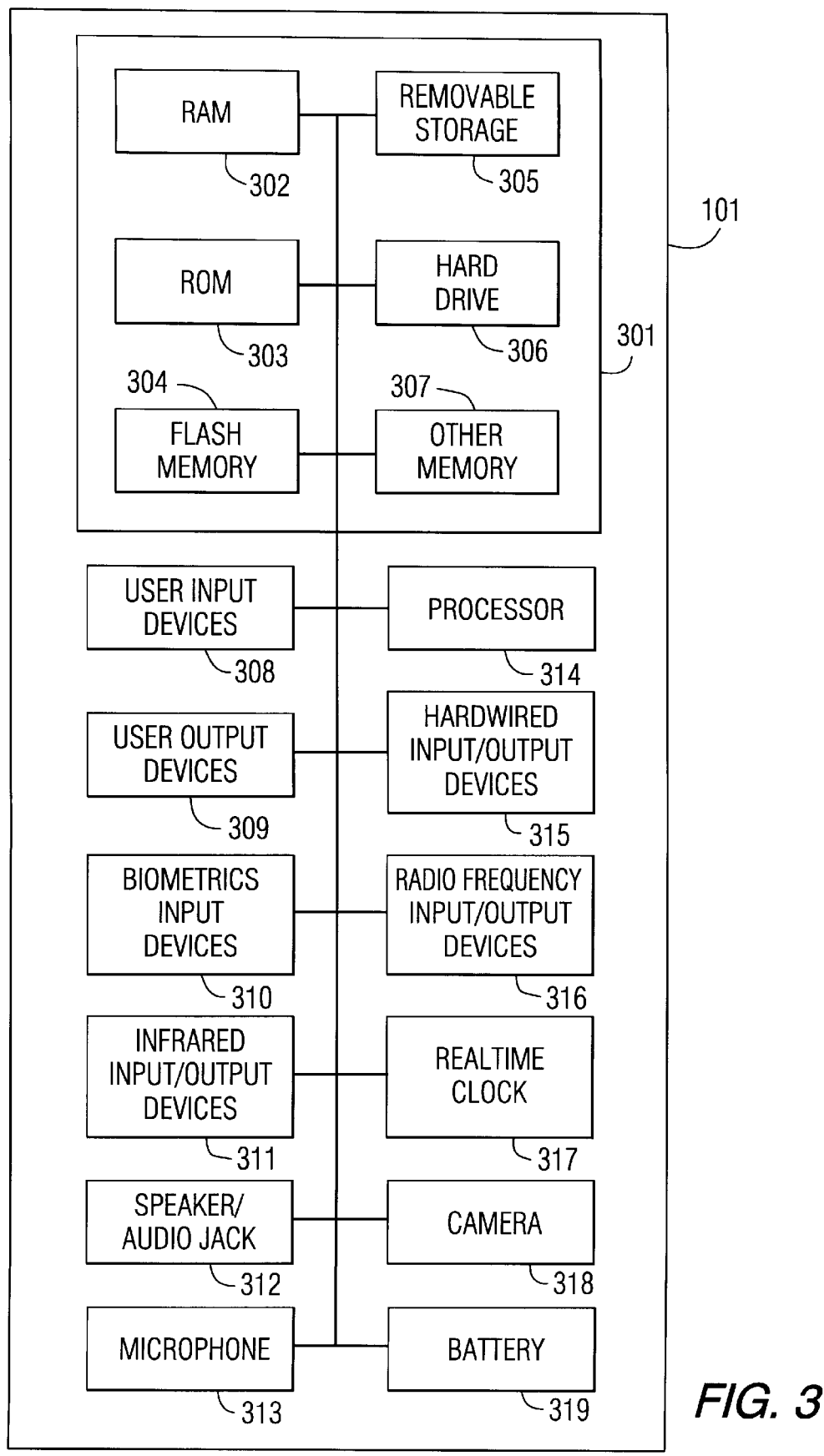
FIG. 3 is a block diagram illustrating elements of the device of FIG. 1.

FIG. 3 illustrates further details of one embodiment of the device 101. The device 101 in one embodiment, is a handheld device and in various embodiments includes certain features associated with a personal digital assistant (PDA) a window CE based digital assistant, a "smart" cell phone or a "smart" beeper. The device 101 further includes specific hardware and software elements as taught by the present invention, such as a finger print reader and tamper-resistant memory, which will be discussed in detail below. Referring to FIG. 3, the device 101 includes a memory module 301 having various memory and storage elements included therein. The memory module 301 in one embodiment, includes a random access memory (RAM) 302, a read only memory 303, a nonvolatile memory 304 (e.g. flash memory or random access memory that is backed up by a battery or other electrical storage device). The memory module 301 further includes removable storage 305 (e.g., memory sticks or memory expansion cards) a hard drive 306 and other memory devices 307. Typically, the memory module 301 stores both executable software code and data. Because several different types of devices can serve as the hardware platform for the device 101, the specific characteristics and features of the software code and data stored therein are directly dependent upon the hardware platform. Further, the software code and data elements (and also the hardware elements) include elements germane to the present invention as discussed further below.

Typically, the software code and data stored in the memory module 301 is backed up automatically or by the user using conventional memory backup processes. For example, a typical personal digital assistant allows code and data stored in memory to be backed up to a computer. It should be noted, however, that the device dependent key feature of the present invention (to be discussed further below) is not backed up in accordance with standard memory back up procedures.

The device 101 further includes: at least one user input device 308 (e.g., a keyboard, pen input, or touch screen), at least one user output devices 309 (e.g. a display screen, Braille output or a video output jack), at least one biometrics input device (e.g. a fingerprint reader), infrared input/output devices 311 (for communicating with, for instance, the computer 103), speaker/audio jacks 312 and a microphone 313 (or an audio input jack) for providing audio input (especially speech) to the device 101. The device 101 further includes a processor 314 for executing the software code and processing the date associated with both the conventional features of the device 101 and those additional features associated with the present invention. Hardwired input/output devices 315 can, in various embodiments, include a serial port, a parallel port, a cradle connection, a universal serial bus port or a firewire port. Radio frequency input/output devices 316 include in various embodiments a receiver, transmitter, transceiver and any other elements required to communicate via the multiple communications links illustrated in FIG. 1. The device 101 further includes a real-time clock 317 and a battery 319 for providing electrical energy. In one embodiment, the device 101 also includes a camera 318.

As discussed above, the device 101 can be one of many different platforms that provide specific functionality for the user (e.g. a smart cellular phone or a personal digital assistant). According to the teachings of the present invention, the device 101 is augmented by additional elements that allow the device 101 to operate as a trusted device, that is, a device requiring user authentication. The user proves his or her identify to the device 101 in various embodiments using one or more multiple techniques such as a password, biometrics input, and physical possession of the device 101. Once the user has been authenticated to the device 101, the device 101 provides the user with access to the site 105 using strong passwords that are changed frequently and unknown to the user. But, the device 101 can also take advantage of existing secure communication techniques (e.g. the Windows-based secure sockets layer) for exchanging information with the site 105. Further, the device 101 interfaces with insecure machines, such as the computer 103, but the transaction details are controlled from and displayed only to the user via device display. The transactional details are not displayed on the insecure computer 103 and the communications link between the device 101 and the computer 103 operates in a secure or encrypted mode. Others with access to the computer 103 can therefore not modify or control the transaction and further viruses residing on the computer 103 are unable to intervene in the transaction. 101. The computer 103 sees only a string of encrypted bits. The bits cannot be read, understood (no eavesdropping) or changed by the computer 103 because the transaction with the site 105 is controlled and monitored from the device 101. If the computer 103 was capable of making a change to even one bit, the change would be detected by the device 101 and the site 105. Thus the device 101 provides a secure link to a trusted site via an untrusted computer 103. A prosaic analogy of the interaction between the device 101, the computer 103 and the site 105 is as follows. If a first party wishes to mail important confidential papers to a second party, the papers are locked in a small safe by the first party. The safe combination is known only to the first and second parties. The first party sends the safe by overnight courier to the second party. The courier cannot open the safe and read or change the documents; it simply delivers the safe as-is. The device 101 is analogous to the first party, the computer 103 to the courier and the site 105 to the second party.

Figure 4:
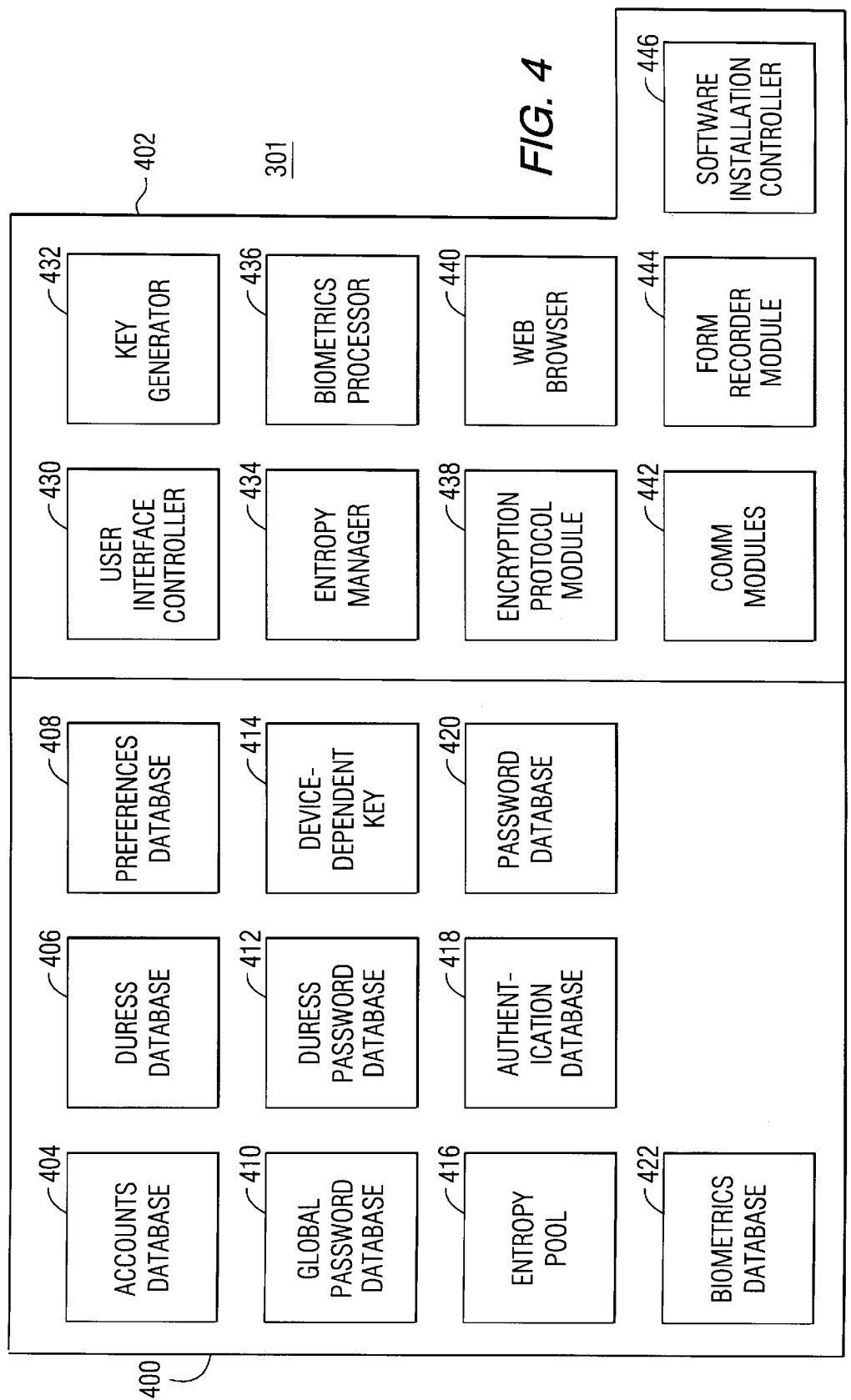
FIGS. 4 and 5 are block diagrams illustrating the data and code stored in the memory of the device of FIG. 1.

FIG. 4 illustrates certain elements of the memory module 301 as segregated between a data module 400 and a code module 402. In one embodiment the information stored in the data module 400 is stored in encrypted form and decrypted only as required during operation of the device 101.

After the user has been authenticated to the device 101 (to be discussed in detail below), the user is given access to an accounts (e.g., resources or sites) database 404, where each account name, user identification and password for the user-accessible accounts are stored. The account name describes the account or site with an identifier recognizable to the user. As discussed further below, the device 101 displays the account name when the user desires to select an account for access. The user identification and password associated with each account or site are account specific. That is they are dependent upon the process and data entry required for accessing the account. The account name may also include the uniform resource locator (URL) of the account in the Internet or local area network.

In one embodiment, the device 101 includes a feature to prevent attackers from gaining access to the accounts database 404, as certain of the accounts stored there may contain sensitive data the release of which would be detrimental. Therefore, if the user is under pressure or is being threatened to reveal the global password (i.e., one of the three authentication processes employed according to the present invention and discussed further below) to gain access to the device 101 and thus the accounts database 404, the user instead reveals or enters a duress password. The device 101 responds to the duress password in an apparently normal fashion, but unknown to the attacker, the duress password provides access only to those accounts listed in a duress database 406. Thus the accounts in the accounts database 404 are protected from disclosure and access by the attacker. The attacker cannot determine that the entered password is false. The duress database 406 is accessed when the user enters the duress or fake password; the accounts database 404 is not accessible with the duress password. The duress database 406 is structured like the accounts database 404, but contains only those accounts that the attacker can see and access without compromising the user. Those accounts within the accounts database 404 that would compromise the user if accessed by an adversary are not repeated in the duress database 406. Further, when the user enters the duress password, the accounts database 404 is permanently deleted. To avoid creating any suspicions within the attacker, the duress database 406 can include a few legitimate accounts, but only those that will not cause any harm if accessed by an attacker.

A preferences data base 408 includes selected user stored options including, the length and change frequency (e.g. monthly, daily or at every log in) for the account passwords. The preference data base 408 also includes a selectable option for enabling the duress password function and other options related to the entry mode for the global password, which is the password entered by the used to authenticate to the device 101. For example, in one embodiment, the global password is combined with biometrics information, requiring the user to "sign" the password rather than entering the password through keyboard strokes. The preferences data base further includes instructions as to whether the user can see the account passwords, add new accounts or change any of the preferences. In certain applications, the preference data base 408 may not be modifiable by the user. For example, if a corporate organization issues the device 101 to a user, the device 101 may be configured with certain preferences as desired by the employer. In this way, the employer controls the security of the resource access process via the device 101, by for instance, not permitting the user to change the password modification frequency. For maximum security, the preferences database 408 can be configured for optimum password security by requiring an account password to be changed at each log in. Giving the user the ability to change this preference to a monthly password update, might compromise site access process.

A global password database 410 stores the correct user or global passwords that the user enters to gain access to the device 101. In one embodiment, the global password can be merged with biometrics information. For example, if the biometrics involves an analysis of a handwritten signature, then the user may choose to sign the password instead of entering the password via a keyboard (or Graffiti input) then writing the signature. Combining the global password with the biometrics reduces the authentication time because the biometrics requirement and the password entry are accomplished in a single action.

Obviously, it is more convenient to sign the password to accomplish the password and biometrics entry simultaneously, but this process is also less secure. For example, if the user loses the device 101, a very sophisticated attacker could possibly read out the memory contents. If the contents of memory are encrypted, then the user will not obtain any useful information. Therefore, the device provides an extra layer of security whenever the memory contents are encrypted. But, if the memory information is stored in encrypted form then a user must enter a user or global password in a form readily discernable by the device 101. The device 101 must be able to understand and interpret each letter of the password (entered via a keyboard or special Graffiti language). Alternatively, if the user signs the user password, the device 101 cannot interpret the written word because the all the device sees is a single scribble. The device 101 can determine whether the scribble is an authorized one (to authenticate the user), but cannot determine exactly the individual letters in the scribble and therefore cannot test the password against the authorized passwords. Thus two device options are available. If the memory contents are not stored in encrypted form the password can be signed. If the memory contents are encrypted, the user can first sign a word or phrase for the biometrics authentication process then enter another password in the form of individual distinct letters.

A duress password database 412 stores the duress password discussed above. In one application of the teachings of the present invention, a plurality of users can be permitted use of a single device 101. In this situation, the global password database 410 and the duress password database 412 store the global password (also referred to as the user password) and the duress password for each authorized user. The duress password is entered into the device 101 in a manner identical to entry of the global password. A third party observing password entry cannot determine whether the user has entered a duress password or the global password. The device 101 responds to both passwords in the same manner. When the user enters the duress password, the account database 404 is deleted and the contents of the duress database 406 are copied into the accounts database 404. Entry of the duress password, followed by successful completion of the remaining authentication steps, allows access only to the accounts listed in the duress database 406. Therefore, when the device 101 is configured, the user or issuing party should include only non-sensitive accounts in the duress database 406.

As noted above, there are three independent processes for authenticating the user to the device 101: what the user has (the device 101), what the user knows (the global or user password), and what the user is (as determined by the user's biometrics).

The first requirement limits access by the user to only those accounts previously stored within the accounts database 404 on a specific device 101 intended for use by a specific user. For example, if an employer issues the device 101 to all employees, each employee will be able to access those accounts as established by the employer and as set forth in the accounts database 404. The employer may, for instance, allow each employee to access only the corporate servers and not access any Internet accounts. If the user loses the specific device 101 assigned to him or her, it should not be possible, to ensure that security is not compromised, for the user to buy a replacement device, restore the backed-up data to the replacement device and use then use replacement device. According to the teachings of the present invention, the user must instead request a replacement device from the employee at which time the identity of the user can be checked by security personnel. The employer then activates a new device 101 and stores in the accounts database 404 only those accounts to which the employee is permitted access.

The inability of the user to purchase a replacement device 101 and load it with the backed-up contents of a lost device is controlled by a device dependent key 414. The device dependent key 414 is a random key stored unencrypted in the data module 400 (i.e., long-term memory). The device dependent key 414 is required to decrypt the encrypted data in the data module 400, including decryption of the user's global password. The device dependent key 414 is not visible to the user, cannot be changed by the user, and is not backed up when the code and data stored in the device 101 is backed up. Thus, if a user loads backed-up data from a lost device to a new device, the device dependent key is not loaded to the new device and thus the data in the new device cannot be decrypted and therefore the new device will not function. A related situation where the device dependent key 414 serves an important function occurs when the teachings of the present invention are applied to a personal digital assistant and the user backs up the contents of the personal digital assistant to a desktop computer. According to the present invention, the contents of the memory modules 400 and 402 are backed up in encrypted form. An attacker cannot derive the contents of the memory modules 400 and 402 from the backed up data, because the device dependent key is not backed-up, but is required to decrypt the backed-up information.

The device dependent key 414 is created by the issuing organization, who maintains a copy of it. If the device 101 is lost or stolen, the user must request a new device from the issuing organization. Generally, the new device 101 uses the same device dependent key 414 as the lost device. The device dependent key optional feature according to the teachings of the present invention ensures that an attacker or opponent cannot recover data stored within the device 101, even if given access to encrypted back-ups of that data, the user's global password, and a copy of the user's biometrics. The device dependent key 414 serves as a tie between a specific device 101 and the contents of that device. Loading the backed-up data onto another device and using an authorized user's global password and biometrics will not allow access to the accounts database 404 from a different device. That is because the different device does not have the device dependent key 414 required to decrypt the stored information and the user's password. The device dependent key 414 cannot be backed up and therefore cannot be transferred to another device 101.

The device 101 uses an encrypted communication protocol (e.g., utilizing the secure sockets layer) and also encrypts the data in the device 101. Both of these functions require truly-random numbers that are not simply the output of an algorithm. Algorithms are predictable, and an adversary must not be able to predict these numbers. If the device 101 includes a true random number generator (TRNG) hardware or software. When implemented in software as executed by the processor 314, the executable code of the device 101 uses the generated random numbers for the encryption and decryption processes, as required. Alternatively, the device 101 maintains an "entropy pool" to aid in generating random numbers for the decryption and encryption processes. The entropy pool is a list of truly-random numbers.

In this alternative embodiment, whenever a process executed by the device 101 requires a random number, it is selected from an entropy pool 416 of the data module 400. After each selection, the entropy pool size shrinks. Random numbers are added to the entropy pool 416 each time the user interacts with the device 101.

For instance, when the user pushes a button, writes on the display, or talks into the microphone 313, the exact time and the nature of the interaction are recorded. As is well known to those skilled in the art, these user inputs cause the creation of additional random numbers that are added to the entropy pool 416. Inputs from the various networks with which the device 101 communicates (see FIG. 1)) are also used to produce additional random numbers. The entire entropy pool 416 is then hashed or scrambled. There is no known way to unscramble the entropy pool 416 after the hashing process. The bits in the entropy pool 101 are then analyzed to determine the number of truly random bits. Whenever random numbers are needed, for example for creating passwords or for salts, nonces and initializing vectors during encrypted transmission, random bits are removed from the entropy pool 416 and the entropy estimate is accordingly recalculated. In the event that random bits are needed when the entropy pool 416 is depleted, the device 101 prompts the user to create more entropy bits through random inputs. Inputs can be provided by simply pushing buttons, scribbling on the pen input for the device 101 or talking into the microphone 313. In one embodiment, the entropy pool 416 is not backed up during the memory backup process executed by the device 101.

The authentication database 418 stores details of the access process for each of the accounts listed in the accounts database 404. The process executed by the device 101 for obtaining the access information from each of the account resources is discussed below. In the case of a web site, for example, the information stored in the authentication database 418 includes the format for submitting user identification and password information to the web site. The process of logging on to a web site is performed by the device 101, and in one embodiment is not visible to the user via any of the user output devices 309. For other sites to which the user has access, the authentication database 418 includes the necessary addresses and protocol information required to access the site (e.g., a network server).

A password database 420 stores information describing the process for changing the password for the sites in the account data base 404. The password database 420 includes the site-specific format for submitting the user identification data, the old access password and the new access password. As discussed above, the device 101 is programmed to change account passwords at an interval set forth in the preferences data 408. The process of changing passwords for accessible sites is performed without user intervention. For example, if the preferences data base 408 indicates that a specific site password is to be changed every time the user logs in, the device 101 proceeds to carry out that command each time that account is accessed. This process is discussed further below in conjunction with FIG. 8.

Information for verifying a user's biometrics is stored in a biometrics database 422. Exemplary biometrics data includes information on the path and speed of a pen during signature, fingerprint descriptions, iris scans and voice prints. In one application of the device 101, several users are authorized to use a specific device and therefore the biometrics database 422 stores biometrics for each of the authorized users.

Software code stored within the code module 402 is stored without encryption. Although this code may be stored temporarily in the random access memory 302 during execution, there is no long term storage of the data in the code module 402.

A user interface controller 430 of the code module 402 controls the user interface of the device 101, offering the user operational options and presenting a list of sites that are accessible. In essence, the interface controller manages all input and output operations between the user and the device 101.

A key generator 432 generates new random account passwords for use in accessing the accounts in the accounts database 404. The account passwords are generated using the entropy pool 416. The generated passwords can optionally be made pronounceable and/or viewable on the screen of the device 101. In one embodiment the account passwords are not displayed on the device display; in another embodiment the account passwords are displayed. The choice of the operative embodiment is selectable by the user. For example, a user may use the device 101 in locations and situations where the device 101 cannot be connected to a computer (i.e., the computer 103), such when there is no pre-established communications link between the device 101 and the computer 103 (in a cyber café, for example) and when a cradle for interfacing the device 101 to the computer 103 is not available. Another situation where the password should be visible on the device display is when the user calling technical support for a site or network resource via a telephone, and the user must reveal the password to the technical service personnel. When the computer 103 is not available, to access the site, the user types the account password directly into the device 101. When the computer 103 is available, the device communicates the password to the computer 103 in encrypted form and the computer 103 transmits the password to the site 105. Recall, as discussed above, that the computer 103 includes a web browser for interfacing with the site 105. The latter embodiment where the password is visible on the device screen offers the better security. Note that if an employer distributes the device 101 to its employees, the employer can set the preferences (as stored in the preferences database 408), and prevent the user from changing them. One such preference involves the choice of a displaying the password.

The entropy manager 434 controls the entropy pool 416, as discussed above, including the generation of new random numbers.

The biometrics processor 436 compares biometrics input from the user with stored biometrics information (in the biometrics database 432) for authorized users for determining whether the user is a permitted user of the device 101.

The encryption protocol module 438 manages the secure communications between the device 101 and the site 105. One example of such a protocol is the secure sockets layer (SSL). This protocol is used by those worldwide web sites having an address of the form "https://". Use of existing secure protocols (such as the secure socket layer) together with the security features offered by the device 101, allows communications over an encrypted link with existing web sites, while providing security features by way of the device 101 beyond those provided by existing communications system protocols. The encryption protocol module 438 also includes encryption and hash algorithms, for instance, for use by the entropy manager 434 and to encrypt data bases backed up by the device 101.

A web browser 440 controls sessions between the user operating the display 101 and the accessed web site, for instance the site 105. The web browser 440 displays web site information on the device display and further accepts input from the user via the user input devices 308 of the device 101. In another embodiment, the device 101 also permits the untrusted computer 103 to display web pages and accept user input. In that embodiment, however, the device 101 encrypts the account passwords and other confidential information (e.g., details of a stock transaction) passing between the site 105 and the device 101. The computer 103 cannot interpret or understand the random bits that it sees and so cannot intercept the password or alter the confidential details of the transaction.

A communications module 442 manages all communications aspects of the device 101, including the various communications links illustrated in FIG. 1. Exemplary communications types managed by the communications module 442 include: infrared, cellular telephone and personal communications services, Bluetooth, all types of radio frequency based communications, connection to a cradle, and connection to the external credit-card writer 211.

The software within a form recorder module 444 allows the user to access a new Web site, and controls the site sign-on process of entering a user identification and password for future access to the site. Under control of the Web browser 440, the user goes to the site page and enters a standard user identification, in one embodiment, the identification can be "USER". A standard password, in one embodiment "PASSWORD", is then entered. The site will not accept this identification information and password, but through this process the device 101 has stored the layout of the form that was returned to the site. For future logins to the site, the device 101 replaces "USER" with the user identification and replaces "PASSWORD" with the network resource password, as generated by the entropy manager 434, as discussed above. The site or network resource captures the entered password and thereafter this password is required for access to this site. However, as discussed herein, the password is frequently changed, is generated randomly and is not known to the user. Thus a "strong" password has been created and the security associated with accessing the site improved significantly. This process of learning the site template must be executed only once for each site or account in the accounts database 404.

In an application where the device 101 is issued to the user by an issuing organization, the device 101 can be preloaded with site specific information, thereby avoiding execution of the site entry process described above. When the site 105 is a web site, the form recorder module 444 also stores the uniform resource locator of the web site, the parameters of the web site form for entering the user identification and password when authenticating to the web site and the cookies to store from and send to that web site. If the site 105 is on a local are network (for example, a network server) then the stored data includes the network address, the user identification and password and any additional information needed to authenticate to the local area network device.

A software installation controller 446, installed in one embodiment of the device 101, modifies the device operating system such that no additional software can be installed on the device 101. That is, the software on the device 101 is frozen and no additional programs, operating system software or executable software can be installed. This feature of the device 101 prohibits the introduction of virus software or other malicious code. If it is later desired to install new software, the operating system software must be reset, which erases certain data and executable code stored in the memory modules 400 and 402, and the user must then reinstall all the software and data for proper operation of the device 101.

Figure 5:
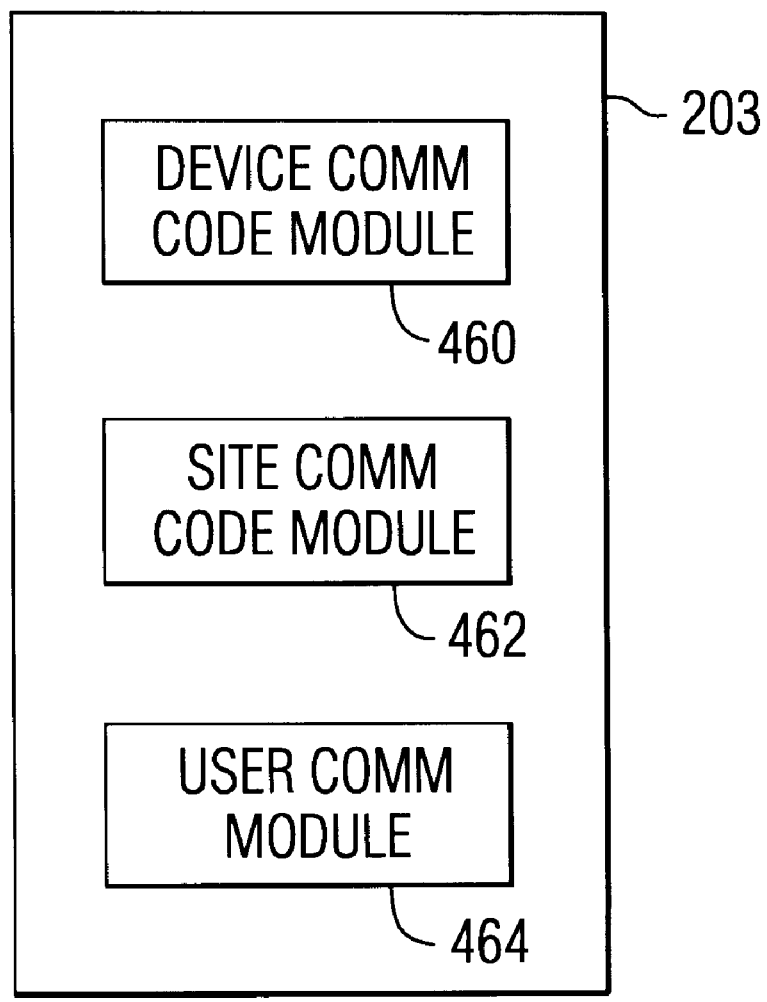

FIG. 5 illustrates certain elements of code and data stored within the memory 206 of the computer 103. The executable code resident on the computer 103 is simpler than the code on the device 101 in the embodiment where the computer 103 serves primarily as a conduit for data passing between the device 103 and the site 105. However, the computer 103 can in fact be a fully functional computing device, but all the attributes of the computer 103 will not be utilized when operating with the device 101, so as to ensure the security features in accordance with the teachings of the present invention are operative.

A device communications code module 460 stores software for communicating with the device 101. The specific nature of the stored code is dependent upon the type of communications link or links available between the computer 103 and the device 101. In operation, the device 101 provides the computer 103 with data to send to the site 105. The computer 103 receives data from the site 105 and transmits it back to the device 101. In one embodiment, the computer 103 and the device 101 can encrypt the information passed between them. This embodiment requires that both the device 101 and the computer 103 include an encryption key, for instance as contained within the encryption protocol module 438 of the device 101. In this embodiment, the device 101 functions only with the specific computer 103 in which a decrypting key has been installed. Such a decrypting key can be stored within the device communications code module 460. Situations requiring high security between the device 101 and the computer 103 suggest the encryption of the communications link operative between them. As an additional security device, the device communications code module 460 is configured to require that before specific accounts (stored in the accounts data base 404) are accessed, a certain group of users or all users must cooperate in some way to access that account. This feature adds an additional layer of security to the process of accessing sites 105 from the device 101. Finally, as discussed above, A site communications code module 462 communicates with the sites 105 via the network 106. For accessing web sites, the site communications code module includes browser software. Other site specific software is may be required, depending upon the sites or other resources to which the user of the device 101 has access.

A user communications module 464 communicates with the user of the computer 103, such as through a web browser or other graphical user interface displayed on the computer display screen. Inputs from the computer user can be sent to the device 101 and the device 101 can send data to the computer user, both of which appear on the computer display, under control of the device communications code module 460. As discussed above, the device 101 encrypts the information transferred to the site 105 via the computer 103. Also, the site 105 encrypts the information that it sends to the device 101. In particular, the site password is encrypted. Thus the untrusted computer 103 cannot intercept, modify or divert information passing between the site 105 and the device 101 in encrypted form. At the user's election, non-secure information can be communicated between the device 101 and the site 105 in unencrypted form so that the computer 103 can participate in the data exchange process, by, for example, displaying information on the computer display.

Figure 6:
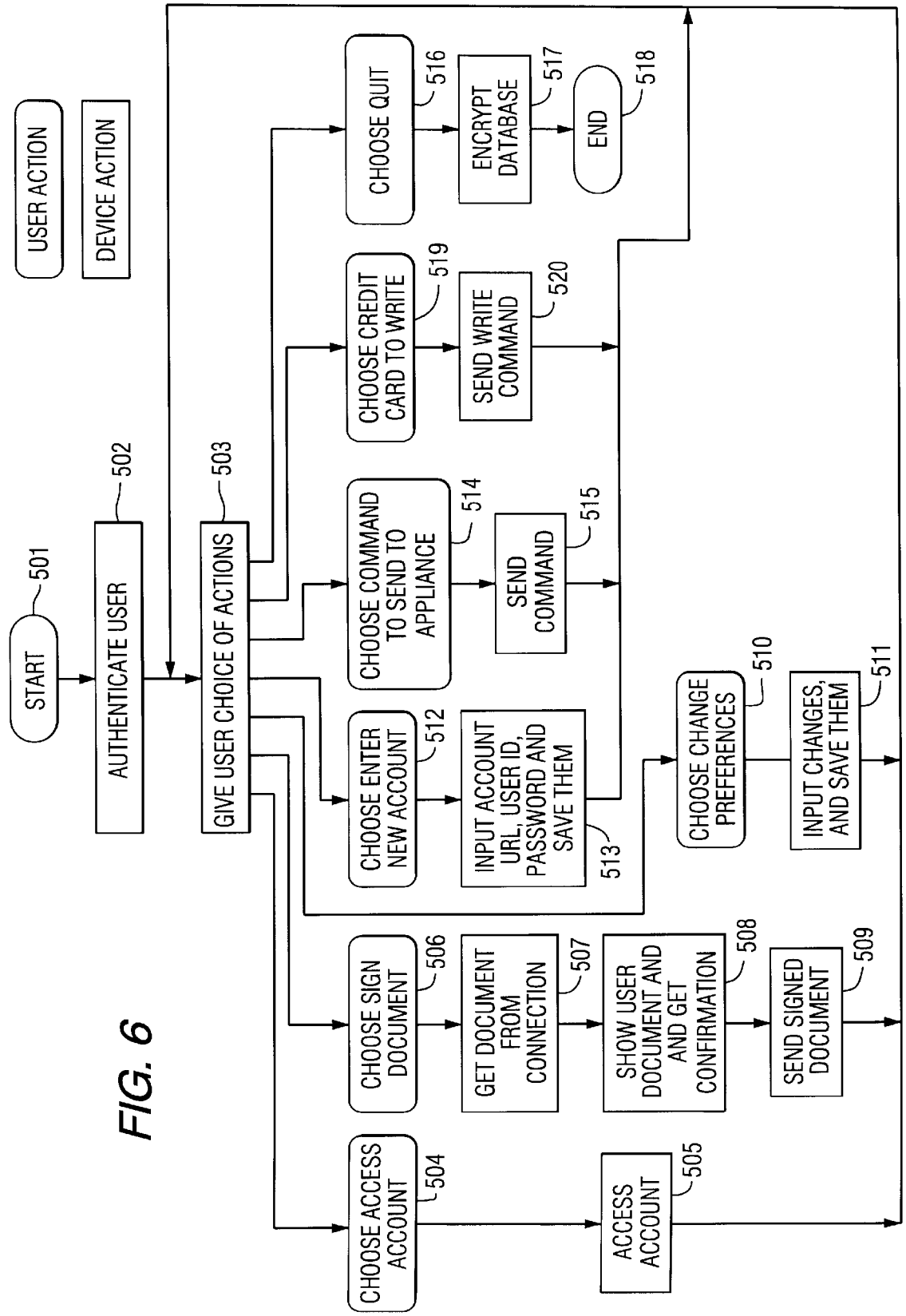
FIGS. 6, 7 and 8 are flowcharts illustrating the operation of the device of FIG. 1.
Figure 7:
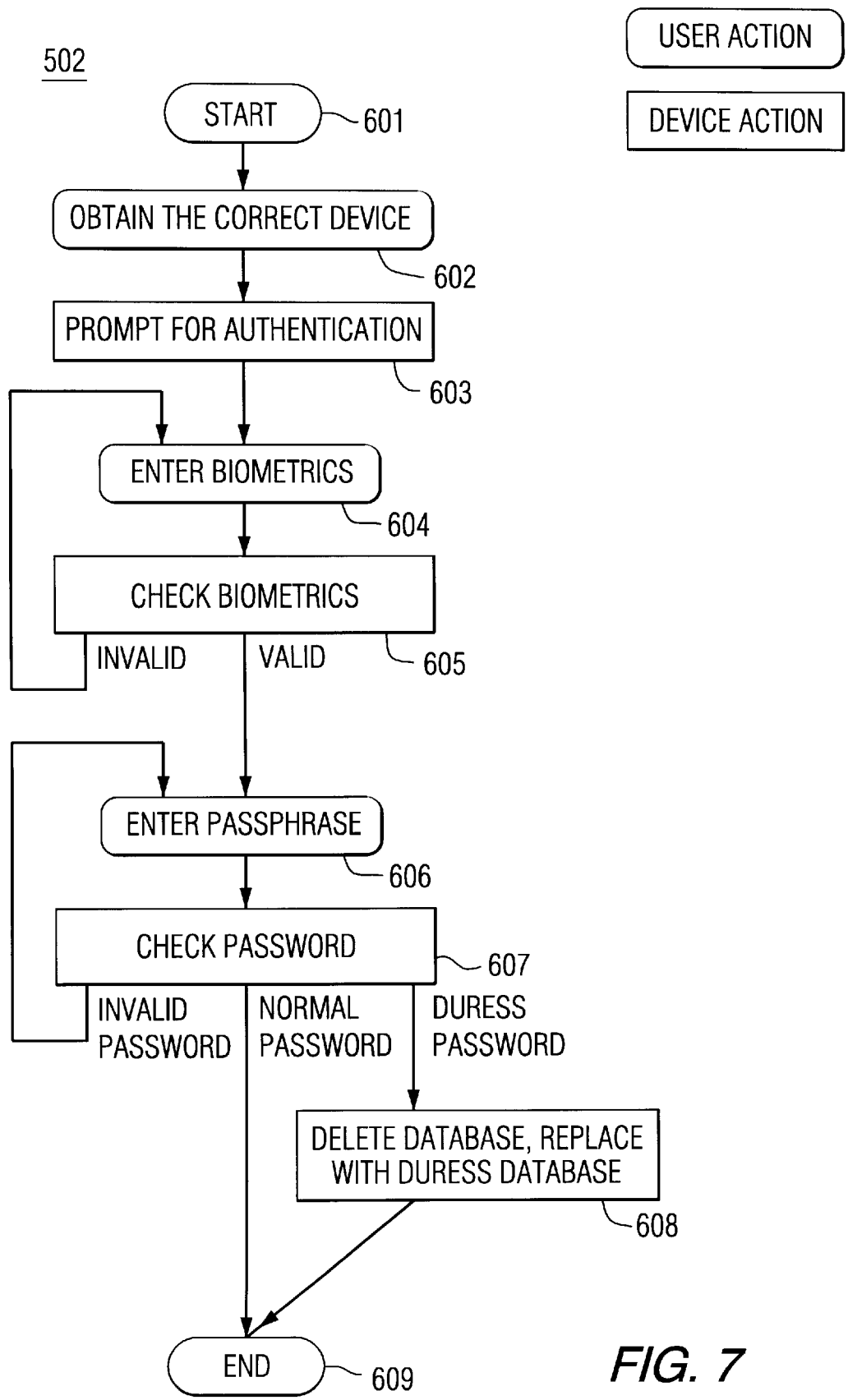
Figure 8:
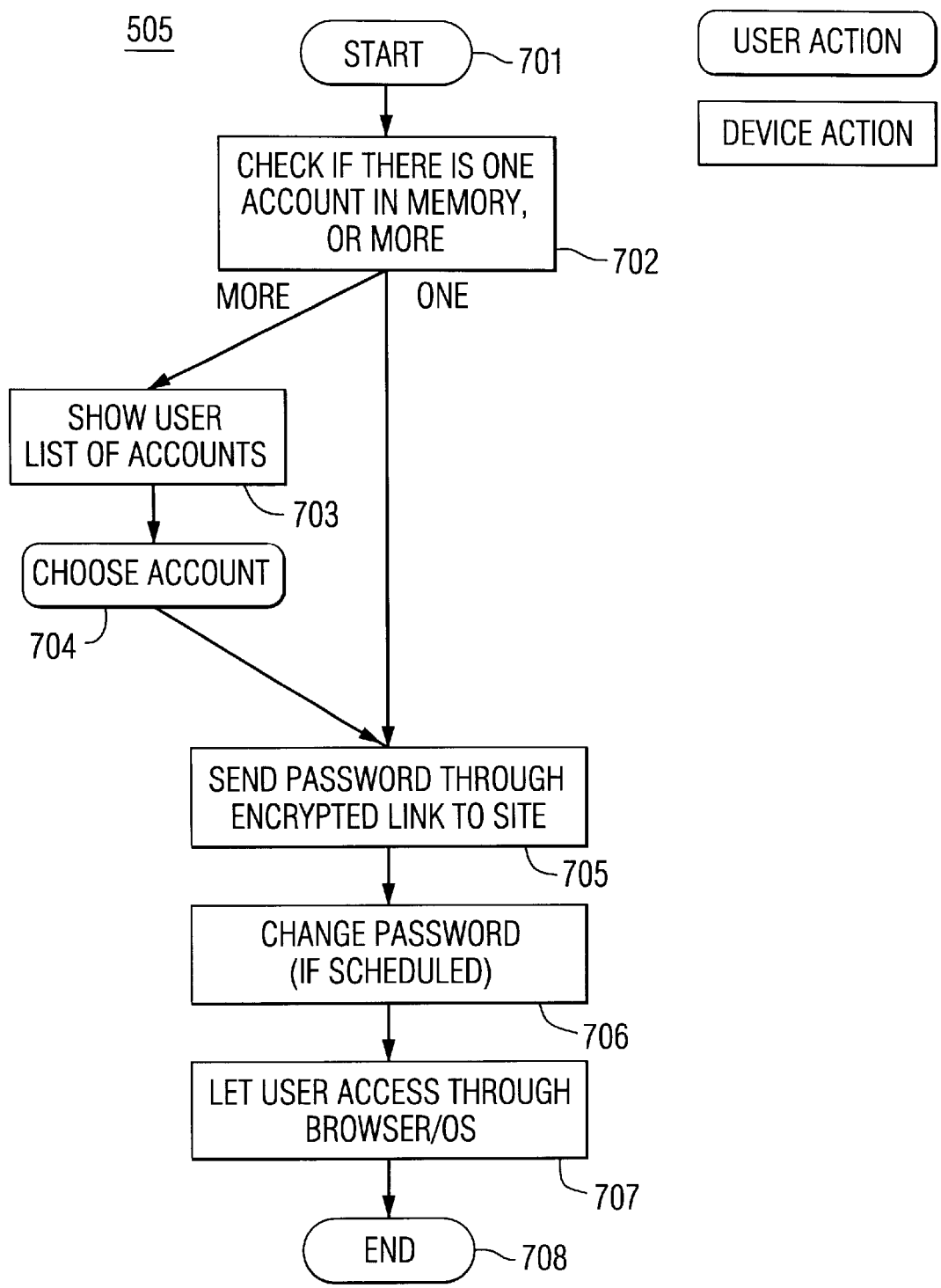

The operation of the device 101 is described in detail in conjunction with the flow charts of FIGS. 6, 7 and 8. FIG. 6 is a high-level flow chart including an authenticate user step 502 and an access account step 505, which are described in greater detail in FIGS. 7 and 8.

The FIG. 6 flow chart illustrates the steps the user executes under control of the device 101 in the preferred embodiment. The process begins at a start step 501 followed by a step 502 where the user is authenticated. Generally, the authentication process involves three factors: what the user has (the device 101), what the user knows (the global password) and what the user is (the user's biometrics). The authentication step 502 is described in greater detail in conjunction with FIG. 7.

At a step 503, the device 101 displays a menu of possible operations. The user can choose to perform various housekeeping operations, such as entering new account information at a step 512. At the step 512, the device 101 prompts the user for new account information. At a step 513 the user enters the account name and uniform resource locator (or other applicable address for the resource), the user identification and the password. This information is also stored at the step 513. Additionally, if account access requires entry of a credit card number, that information is also collected and input at the step 513. Following the step 513, processing returns to the step 503, where the user is again presented with the opportunity to choose an operation from the displayed menu.

Another housekeeping function involves changing certain preferences at a step 510. If the user is authorized to change preferences stored within the preferences database 408, then the device 101 displays the current preferences and allows the user to change them, as shown at a step 511. Under control of the processor 314, certain of the preferences may be changeable by the user and others may not. Information about which of the preferences are changeable by the user and which are fixed is also stored in the preferences database 408. Processing returns to the step 503 following execution of the step 511.

Another choice presented to the user at the step 503 is to quit the process, as shown at a step 516. After choosing to quit, at a step 517 the device 101 encrypts all of the data within the data module 400. The device 101 logs the user out and ceases to function until the user is again authenticated at the step 502.

In addition to housekeeping operations discussed above, at the step 503 the user is also presented with the opportunity to perform certain operations offered by the device 101. These operations can include: accessing the accounts or resources, sending a command to an appliance, writing a credit card or signing a document. If the user elects to access an account, the process continues to a step 504, which is discussed further below in conjunction with FIG. 8.

Exemplary appliances that the user can securely control using the device 101 include: a dishwasher, refrigerator, dryer, an exterior door lock, a telephone or an oven. Future models of these and other appliances will include a communications component for receiving a signal for controlling the appliance. One communications protocol for accessing the appliance is the Bluetooth standard. Bluetooth-enabled appliances can therefore be controlled in a secure mode by use of the device 101. The device 101 communicates with the computer 103, and the latter provides the applicable control signals to the appliance over a Bluetooth communications link with the appliance. To exercise such control over the appliance, it is only necessary that the device 101 establish a communications link with the computer 103; the computer receives the secure signals from the device 101 and passes them along to the appliance. If the link between the computer 103 and the appliance is not secure, then the computer 103 can generate the appliance control signals in response to the signals received from the device 101. In another embodiment, the device 101 includes Bluetooth communications components and communicates directly (and securely) with the appliance for controlling it.

Also, the device 101 provides the user with the ability to establish a secure communications link from the computer 103 to a receiving terminal, under secure control of the device 101. For example, if the user wishes to send a secure facsimile or email, the device 101 can command the computer 103 to establish such a secure or encrypted communications link with the receiving terminal. The information to be sent originates with the device 101, where it is first encrypted and then transmitted to the computer 103 over a secure link. The computer 103 can further encrypt the information or simply send it as is to the receiving terminal over the previously established secure link. Information originating at the receiving terminal passes through the computer 103 as encrypted random bits and is transmitted to the device 101 over the secure link.

If the user selects the option of sending a command to an appliance at the step 503, processing moves to a step 514 where the user chooses the specific appliance and the command to be sent. A list of commands can be provided in, for instance a drop down menu, or in another embodiment a free text command interpretable by the device 101 and the appliance can be entered by the user. The command is sent to the appliance at a step 515, either via the computer 103 or directly from the device 101. This process for controlling appliances is intended for simple appliances. For example, a Bluetooth enabled appliance such as a door lock. More complex devices will have a web interface and will therefore be accessed as web accounts at the step 504. Following the send command step 515, processing returns to the step 503 for again presenting the list of options to the user.

If the user chooses to write information to the magnetic strip of a credit card, the process continues to a step 519. At a step 520, the device 101 sends the credit card writer 211 the information to be written on the card, including, typically, the credit card number. The credit card writer 211 writes this information on the magnetic credit card strip. This feature of the present invention allows the user to carry a single featureless piece of credit-card size plastic, including a magnetic strip and transform the plastic into a credit card as desired. Prior to writing to the magnetic strip, the user has entered a plurality of credit card numbers into the device 101, one for each credit card account for which the user desires to create a credit card. Later, when the user needs to use one of these credit cards, he or she selects the credit card write option at the step 503. Alternatively, the user can enter the credit card number and other information to be written to the magnetic strip into the device 101 immediately prior to creating the card. When the user is finished with the credit card he or she can choose the credit card write option at the step 503 and then have all zeros encoded to the magnetic strip at the step 520. This process of writing all zeros renders the former credit card useless. Thus, relying on the trusted aspects of the device 101, the user can create and destroy credit cards as needed.

Another option set forth at the step 503 allows the user to sign a document. Selection of this option continues to a step 506 where a document to sign is chosen and at a step 507 the document is retrieved from storage. In another embodiment, the document can be retrieved via the computer 103 and the network 106. The device 101 displays the document solely on the device display, as indicated at a step 508. Also the device prompts the user to confirm that the displayed document is the one the user wishes to sign. The device 101 digitally signs the document and returns the signed document to storage or sends it to its destination as a step 509 via the network 106.

In accordance with the teachings of the present invention, there are two items to note with respect to the document signature process. First, the document is digitally signed by the trusted device 101, rather than by the untrusted computer 103. This feature reduces the risk of an adversary signing a document, due to the difficulty that an adversary encounters to authenticate to the device 101. Secondly, the user views the document prior to signature on the device 101, rather than viewing it on the untrusted computer 103. This methodology is distinctly different from the prior art document signature techniques utilizing smart cards. Typically, with a smart card, the user views the document on an untrusted computer, such as the computer 103, which then sends the document to the smart card. If the untrusted computer is compromised by a virus or other malicious code, the computer can send anything to the smart card in lieu of sending the document viewed by the user. In response, the smart card signs the alternative document and the user has no knowledge of what has transpired. Note according to the teachings of the present invention, that the document is viewed only on the trusted device 101 and the document that is signed is the document in view.

FIG. 7 describes the method by which the user is authenticated to the device 101. This method includes all three authentication factors: what the user has (the particular device 101), what the user knows (the global password) and what the user is (the biometrics).

The user is authenticated to the device 101 at the step 502 of FIG. 6. Details of the authentication process are shown in FIG. 7, beginning at a start step 601 and then proceeding to a step 602 indicating simply that the user has obtained the correct device 101. It is not possible for the user to log into another device, even if that device is loaded with the data and software from the first device and further even if the user uses the correct password and biometrics. Such a log-in attempt will be unsuccessful because the device-dependent key (see the reference character 414 of FIG. 4) cannot be transferred from one device to another. The device dependent key 414 is required to decrypt the global password (stored within the global password database 410), the biometrics information (stored within the biometrics database 422) and all other data stored within the data module 400 when the device is powered up. But if the user has transferred the contents of the data module 400 to another device, the device dependent key resident there cannot decrypt the data in data module 400 and thus even if the correct password and biometrics are entered, the device will not respond. In the application where the device 101 is issued to users by an entity, the only copy of the device-dependent key 414 is retained by the issuing entity. Since the device-dependent key is device specific, if the user does not have the correct device 101 then the device the user does have has an incorrect device-dependent key and the user will be denied access. Thus the device-dependent key feature ensures that the first authentication factor (possession of the device 101) as represented by the step 602 is satisfied.

At a step 603 the user is prompted to enter biometrics information, by for example, a request to sign the global password, place his finger into a fingerprint reader, speak into the microphone or look into a retina scanner.

At a step 604 the requested biometrics information is collected, for example, by scanning the user's retina. If the device 101 includes a pen-input system (i.e., a touch-sensitive screen), then in this embodiment the biometrics information can be a signature. After the biometrics information is entered, the process continues to a step 605 where the biometrics data is compared with a database of authorized users whose biometrics information is stored within the biometrics database 422. In the example of a signature biometrics, the device 101 checks the speed and timing of the strokes, in addition to the characteristics of the signature, so that it is not possible for an adversary to satisfy the biometrics requirement by simply forging a signature resembling an authorized user's signature. In another embodiment, the user signs a word instead of a signature, which adds another degree of security to the authentication process. In the event the biometrics process does not produce a positive response, the step 605 returns an invalid response and the process loops back to step 604 for entering another biometrics. A device preference, as stored in the preferences database 408 sets a limit on the time available to authenticate to the device 101 and/or the number of permitted authenticate attempts. When either of these limits are reached, the device 101 does not accept additional authentication attempts. As a further protection feature, when either of the limits is reached, the contents of the memory modules 400 and 402 are erased.

If the user passes the biometrics check, processing moves to a step 606 for prompting a password or pass phrase, referred to as a user or global password or pass phrase. The entered password is checked against the contents of the global password database 410 at a step 607. A match indicates a successful authentication and the process moves to an end step 609. If the correct password was not entered, the step 607 returns an invalid response and the process loops back to the step 606 where the user is again prompted to enter a pass phrase. As discussed above, the authentication period and/or the number of authentication attempts may be limited in an effort to defeat authenticate attempts by an adversary.

In one embodiment of the present invention, the step 606 is combined with the step 604, that is the user signs a global password or pass phrase. Checking the global password or pass phrase for biometrics and validity, combines two of the authentication processes into one. Note that in most prior art systems, only a password is required to gain entry. The system of the present invention requires three forms of authentication.

The user may also enter a duress password at the step 606 in lieu of the global password or pass phrase. Recall that the duress password accesses only those accounts listed in the duress database 406 (see FIG. 4), which includes only non-sensitive accounts. If, for instance, the user is coerced into aiding an adversary to gain access to the device 101, the user enters the duress password instead of the global password. The device 101 appears to respond normally, but in reality at a step 608 deletes the entire contents of the data module 400 and replaces the deleted items with items from the duress database 406. In this way, the adversary cannot gain access to the accounts database 404, but the user is protected from the consequences of simply refusing to cooperate with the adversary.

The authentication steps as illustrated in FIG. 7 protect the user if the device 101 is lost or stolen by an attacker. The first level of protection is the global password. Without that the attacker cannot use the device 101 and access any of the accounts in the accounts database 404. If the attacker somehow tricks the user into revealing the global password (called "social engineering"), the device 101 cannot be used because the attacker does not possess the biometrics. Even if the attacker coerces the user to provide the biometrics, the user can enter the duress password at the step 606 and thereby safely deny the attacker access to the important accounts. These features provide important security protections not available in the prior art. Also, the attacker cannot download the contents of the device 101 to another device in an attempt to thwart the described protections because the device dependent key decrypts only encrypted data of a particular device, is not transferable and cannot be backed up. Recall that prior to storing the contents of the device 101, the contents are first encrypted.

Most attacks involving on-line accounts involve guessing the password, which is not difficult for most user chosen passwords. As will be discussed below, the process of logging on to an account in accordance with the teachings of the present invention involves the creation of computer generated passwords that are long, not easily guessed, different for every account, and changed frequently (e.g., every time the user logs into the account.) Thus the most common form of attacks to gain access to an account or resource are avoided.

The process of accessing accounts, shown generally by the step 505 in FIG. 6 is shown in greater detail in the flowchart of FIG. 8.

After a start step 701, at a step 702 the device 101 determines whether there is more than one account stored in the accounts database 404. If there is only one account, processing proceeds directly to a step 705, to be discussed further herein below. If there is more than one account, following the step 702 the process moves to a step 703 where a list of accounts is displayed to the user. At a step 704 the user selects the desired account and the process continues to the step 705.

At the step 705, the device 101 sends the user identification and computer-generated password to the site 105 through an encrypted channel as discussed above. In one example secure sites are accessed using the secure sockets layer encryption scheme. A step 706 controls the password change process. The triggering events or change frequency for the site passwords are stored in the preferences database 408. The password can be changed at a predetermined frequency (e.g., weekly, monthly) or every time the user logs in to the account. Changing the site password at each log-on offers the highest level of security. In any case, if it is now time to change the password, the device 101 commands a site 105 to change the user's password to a new, randomly generated password. As discussed above, the new password can be generated based on the contents of the entropy pool 416. Once the password has been successfully changed, the process moves to a step 707 where access is granted to the account and the user's session with the account is controlled by a web browser or an operating system of the computer 103, for instance if the site 105 is a resource on a local area network. In one embodiment, the steps 706 and 707 occur nearly simultaneously so the process of changing passwords presents no perceptible delay to the user. As a result, it is not unreasonable to change the password at every log-in.

If the site 105 is a web site, the user browses the site with a web browser on the computer 103. If the site 105 is a server on a network, the user uses network based software to control the server session. The site can also be browsed directly on the device 101. Typically, the computer 103 includes a larger display screen than the device 101 so the user preferably browses the site or interfaces with the network resource on the computer 103, using the device 101 only to view secure or sensitive pages. When the user logs off or the session with the site 105 times out, the user must begin the process again at the step 701 to reaccess the site or network resource or to access another site or resource.

Note that under the following circumstances, the process of authenticating to the device 101 and logging in to an account is simple. If the user has only one account and is using a signature as the biometrics and further combines the signature and the global password and does not use the device 101 for other authenticated applications (e.g., for signing documents) then the user interface presented by the device 101 is extremely simple. To log in, the user powers up the device 101 to launch the various software programs discussed herein. The user then signs the global password, which simultaneously checks the global password and the biometrics to authenticate the user. If only a single site is available to the user, then that site is immediately logged into according to the FIG. 8 process.

While the invention has been described with reference to preferred embodiments, it will be understood by those skilled in the art that various changes may be made and equivalent elements may be substituted for elements of the invention without departing from the scope of the present invention. In addition, modifications may be made to adapt a particular situation to the teachings of the present invention without departing from the essential scope thereof. Therefore, it is intended that the invention not be limited to the particular embodiment disclosed as the best mode contemplated for carrying out this invention, but that the invention include all embodiments falling within the scope of the appended claims.

What is claimed is:

1. A device for providing a user with secure access to a network resource, comprising:

a first module for authenticating a user to said device;

a second module responsive to said first module for providing the user with access to the network resource using a network resource password unknown to the user.

2. The device of claim 1 wherein the first module uses one or more of the following to authenticate the user to the device: a user password entered by the user, user biometrics and possession of the device.

3. The device of claim 2 further comprising an accounts database for storing information regarding the network resources accessible to an authenticated user.

4. The device of claim 2 wherein the first module is responsive to a user password or a duress password for authenticating a user to the device.

5. The device of claim 4 including a duress database and an accounts database, wherein entry of a correct duress password to authenticate to the device permits user access only to network resources set forth in said duress database, and wherein entry of a correct user password to authenticate to the device permits access to only network resources set forth in said accounts database.

6. The device of claim 5 wherein the network resources set forth in the duress database are those network resources not containing sensitive information, and wherein the network resources set forth in the accounts database are those to which the user would like to deny access by unauthorized users.

7. The device of claim 2 wherein the device further comprises a biometrics database for storing biometrics of authorized device users.

8. The device of claim 7 wherein the first module is responsive to user biometrics for authenticating the user to the device, wherein the biometrics are compared with biometrics in the biometrics database, wherein the user is authenticated to the device if the user biometrics are determined to match biometrics in the biometrics database.

9. The device of claim 8 wherein the biometrics are selected from among: a fingerprint, a retina scan, a written word, a plurality of written words, and a signature.

10. The device of claim 2 wherein the first module is responsive to the concurrent entry of biometrics and the user password.

11. The device of claim 10 wherein the device further comprises an entry pad onto which the user inscribes the user password, and wherein the biometrics comprise the characteristics of the inscribed user password.

12. The device of claim 2 wherein the device further comprises a user password database for storing user passwords of authorized users.

13. The device of claim 12 wherein the first module is responsive to a user entered password, wherein the entered user password is compared with user passwords stored in the user password database for determining whether the user is an authorized user.

14. The device of claim 1 further comprising an accounts database for storing network resources information, wherein an authenticated user has access to network resources stored in said accounts database, and wherein the second module is responsive to said accounts database for use in accessing the network resource.

15. The device of claim 14 wherein the access information for each network resource includes the network resource address, the network resource user identification, and the network resource password.

16. The device of claim 15 wherein the network resource password is generated using random numbers.

17. The device of claim 16 further comprising an entropy pool including a plurality of random numbers for use in generating the network resource password.

18. The device of claim 15 wherein the network resource password is modified on a predetermined schedule.

19. The device of claim 15 wherein the network resource password is modified each time access is gained to the network resource.

20. The device of claim 1 further comprising a communications module for transferring data in encrypted form over a communications link between the device and the network resource.

21. The device of claim 20 wherein the communications link is chosen from among: a radio frequency link, an optical link, and an infrared link.

22. The device of claim 20 wherein the communications link comprises the Internet.

23. The device of claim 1 wherein a computer is interposed between the device and the network resource, wherein certain information transferred between the device and the network resource is displayed on the computer, and wherein certain other information transferred between the device and the network resource is in encrypted form and is not displayed on the computer.

24. The device of claim 1 further comprising a magnetic code writing module, wherein when a user is authenticated to the device, the device is operative to write information to a magnetic strip.

25. The device of claim 24 wherein the information written to the magnetic strip includes credit card information and wherein the magnetic strip is affixed to a plastic substrate, and wherein when the account information is written to the magnetic strip, a credit card is formed.

26. The device of claim 1 wherein the device size permits hand-held operation of the device.

27. The device of claim 1 wherein the second module logs the device onto the network resource by contacting the network resource and providing the required log-on information without intervention by the user.

28. The device of claim 27 wherein the log-on information includes the network resource password and wherein the network resource password is created by a random process without intervention by the user.

29. The device of claim 1 further comprising input modules selected from among: a microphone, a touch-sensitive display screen, a keyboard, and a camera.

30. The device of claim 1 further comprising output modules selected from among: a speaker, a display, and a printer.

31. The device of claim 1 wherein a plurality of users are authorized to use a specific device, and wherein the device further comprises an accounts database designating the accounts to which each user has access, a user password database including the user password for each authorized user, and a biometrics database including the biometrics for each authorized user, and wherein the first module is responsive to the user-entered user password and biometrics for comparing the contents of said user password database and said biometrics database for determining if the user is an authorized user, and in response thereto, authenticating the user to the device, thereby permitting the user to access the designated accounts in the accounts database.

32. The device of claim 1 further comprising a preferences database for storing device operational parameters for the authorized user.

33. The device of claim 32 wherein the device operational parameters include the conditions for changing the network resource password.

34. The device of claim 32 wherein after the user is authenticated to the device, the user can change the preferences stored in the preferences database.

35. The device of claim 1 further comprising a device dependent key, wherein the contents of the first and the second module are stored in encrypted form and wherein said device dependent key is required to decrypt the contents of the first and the second modules.

36. The device of claim 35 wherein the contents of the first and the second module are backed up in encrypted form from the device to a storage module, wherein the device dependent key is not backed up to said storage module, such that the contents of the first and the second module as stored in said storage module cannot be decrypted.

37. The device of claim 1 further comprising hardware and software elements for performing functions unrelated to accessing a network resource.

38. The device of claim 1 further comprising a document storage module for storing documents intended for execution by the user, wherein upon authentication to the device, the user retrieves a document from said document storage module and electronically executes the document.

39. The device of claim 1 wherein a document is downloaded from the network resource to the device after the user is authenticated, and wherein the user electronically executes the document and returns the document to the network resource.

40. The device of claim 1 wherein the network resource is an appliance and wherein after the user is authenticated to the device, the device, under user control, communicates with the appliance.

41. The device of claim 40 wherein the device communicates with the appliance by sending a signal for controlling the appliance.

42. The device of claim 40 wherein after the user is authenticated to the device, the device is operative to send a signal to a computer, and wherein in response to said signal, the computer controls the appliance.

43. A method for authenticating a user to a device for contacting a network resource, said method comprising the steps of:
(a) a user providing a user password;
(b) a user providing biometrics;
(c) determining if the user password and the user biometrics match the password and the biometrics of an authorized user;
(d) retrieving from device memory a randomly generated password for the network resource; and
(e) transmitting the randomly generated password to the network resource to gain access thereto.

44. The method of claim 43 wherein the device includes an accounts database for storing information required to gain access to the network resource, further comprising a step (f) adding a network resource to the accounts database.

45. The method of claim 44 wherein the step (f) further comprises:
(f1) accessing the network resource;
(f2) receiving from the network resource a template for providing network resource access parameters required to gain access to the network resource;
(f3) providing at least one dummy network resource access parameter and any additional required network resource access parameters to the network resource;
(f4) storing the network resource template; and
(f5) changing the at least one dummy network resource access parameter when the network resource is next accessed.

46. The method of claim 45 further comprising a step (f6) on a predetermined schedule, changing the randomly generated password for the network resource.

47. The method of claim 43 wherein the step (e) further comprises transmitting the randomly generated password in encrypted form.

48. A method for authenticating to a device for accessing a network resource, wherein certain operational code or data of the device is stored in encrypted form, and wherein the device includes a device dependent key, said method comprising the steps of:

(a) a user providing a user password;

(b) a user providing biometrics;

(c) determining if the user password and the user biometrics match the password and the biometrics of an authorized user;

(d) using the device dependent key, decrypting the certain operational code or data stored in encrypted form;

(e) retrieving from the device memory the randomly generated password for the network resource; and (f) transmitting the randomly generated password to the network resource to gain access thereto.

49. An article of manufacture comprising:

a computer program product comprising a computer-usable medium having a computer-readable code therein for authenticating a user to a device for contacting a network resource, the computer-readable code in the article of manufacture comprising: a computer-readable program code module for receiving a user password;

a computer-readable program code module for receiving biometrics;

a computer-readable program code module for determining if the user password and the user biometrics match the password and the biometrics of an authorized user;

a computer-readable program code module for retrieving a randomly generated password for the network resource; and a computer-readable program code module for transmitting the randomly generated password to the network resource to gain access thereto.

* * * * *